(12) United States Patent  (10) Patent No.: US 8,727,278 B2
Moritz  (45) Date of Patent: May 20, 2014

(54) ARTICLE RETENTION DEVICE

(75) Inventor: Stephen J. Moritz, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 810 days.

(21) Appl. No.: 12/837,796

(22) Filed: Jul. 16, 2010

(65) Prior Publication Data
US 2012/0012702 A1 Jan. 19, 2012

(51) Int. Cl.
B64D 11/00 (2006.01)
B64D 13/00 (2006.01)

(52) U.S. Cl.
USPC ....................................... 244/118.5

(58) Field of Classification Search
USPC ................ 244/117 R, 118.5, 129.1; 211/70.3
See application file for complete search history.

(56) References Cited

U.S. PATENT DOCUMENTS

| 1,529,982 | A | * | 3/1925 | Bunzli | 312/216 |
| 2,126,134 | A | * | 8/1938 | Palley et al. | 49/489.1 |
| 2,615,581 | A | | 10/1952 | Sigrist | |
| 3,275,311 | A | * | 9/1966 | Sichel | 267/163 |
| 5,035,471 | A | | 7/1991 | Ackerman | |
| 5,395,074 | A | * | 3/1995 | Hart et al. | 244/118.1 |
| 5,988,565 | A | * | 11/1999 | Thomas et al. | 244/118.1 |
| 6,527,325 | B2 | * | 3/2003 | Steingrebe et al. | 296/37.7 |
| 7,823,830 | B2 | * | 11/2010 | Feldkirchner et al. | 244/118.1 |
| 8,038,098 | B2 | * | 10/2011 | Johnson et al. | 244/118.1 |
| 2005/0040287 | A1 | * | 2/2005 | Stephan et al. | 244/118.5 |
| 2006/0267358 | A1 | | 11/2006 | Cox | |

FOREIGN PATENT DOCUMENTS

| DE | 4228260 | 3/1994 |
| DE | 19812389 | 11/1998 |
| DE | 102004039135 | 2/2006 |
| EP | 0348130 A2 | 12/1989 |

OTHER PUBLICATIONS

The Boeing Company, "Bin Article Retention," Aeromagazine No. 15, pp. 5-11, Jul. 2001.
International Search Report, PCT/US2011/039157, dated Aug. 31, 2011.

* cited by examiner

Primary Examiner — Valentina Xavier

(57) ABSTRACT

An article retention device may be provided for a stowage bin. The stowage bin may include a bin interior and may include a door panel that is movable between open and closed positions. The door panel may have a door inner side. The article retention device may comprise a spring member having a protruding portion protruding from the door inner side toward the bin interior when the door panel is in the closed position. The protruding portion may be deflectable in response to contact with an article contained within the bin interior such that the spring member applies pressure to the article to prevent relative moment of the article within the stowage bin.

19 Claims, 9 Drawing Sheets

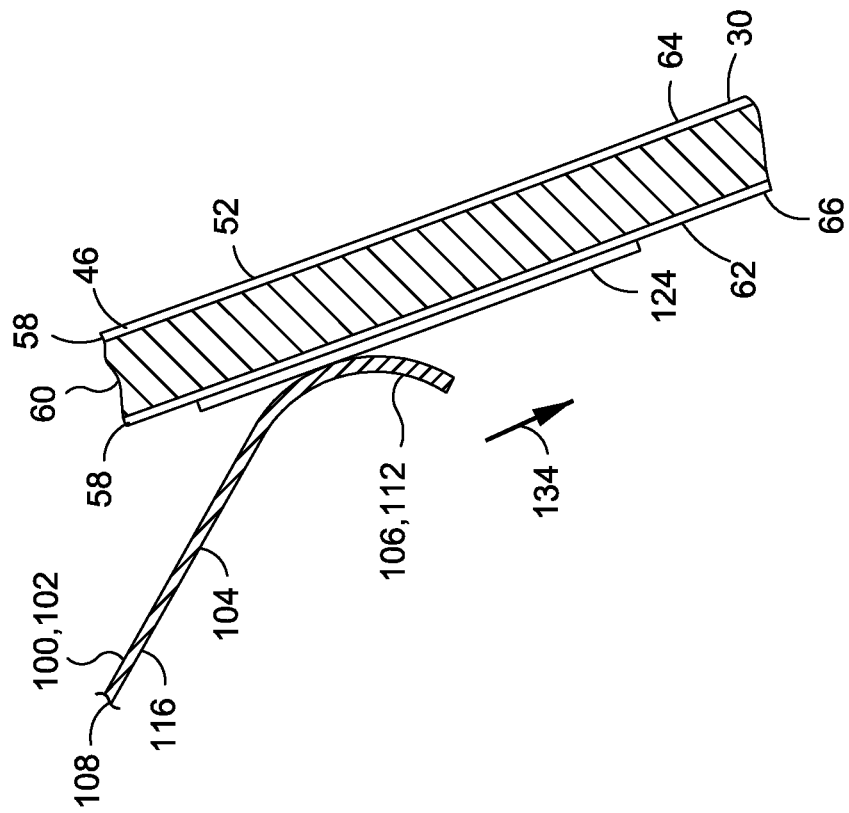
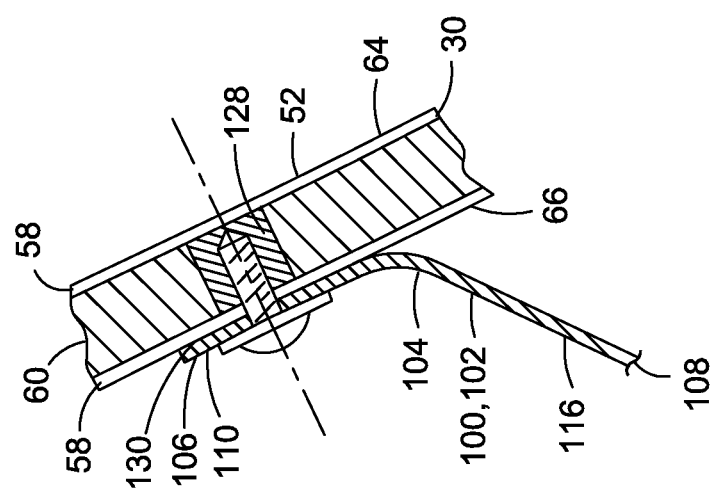

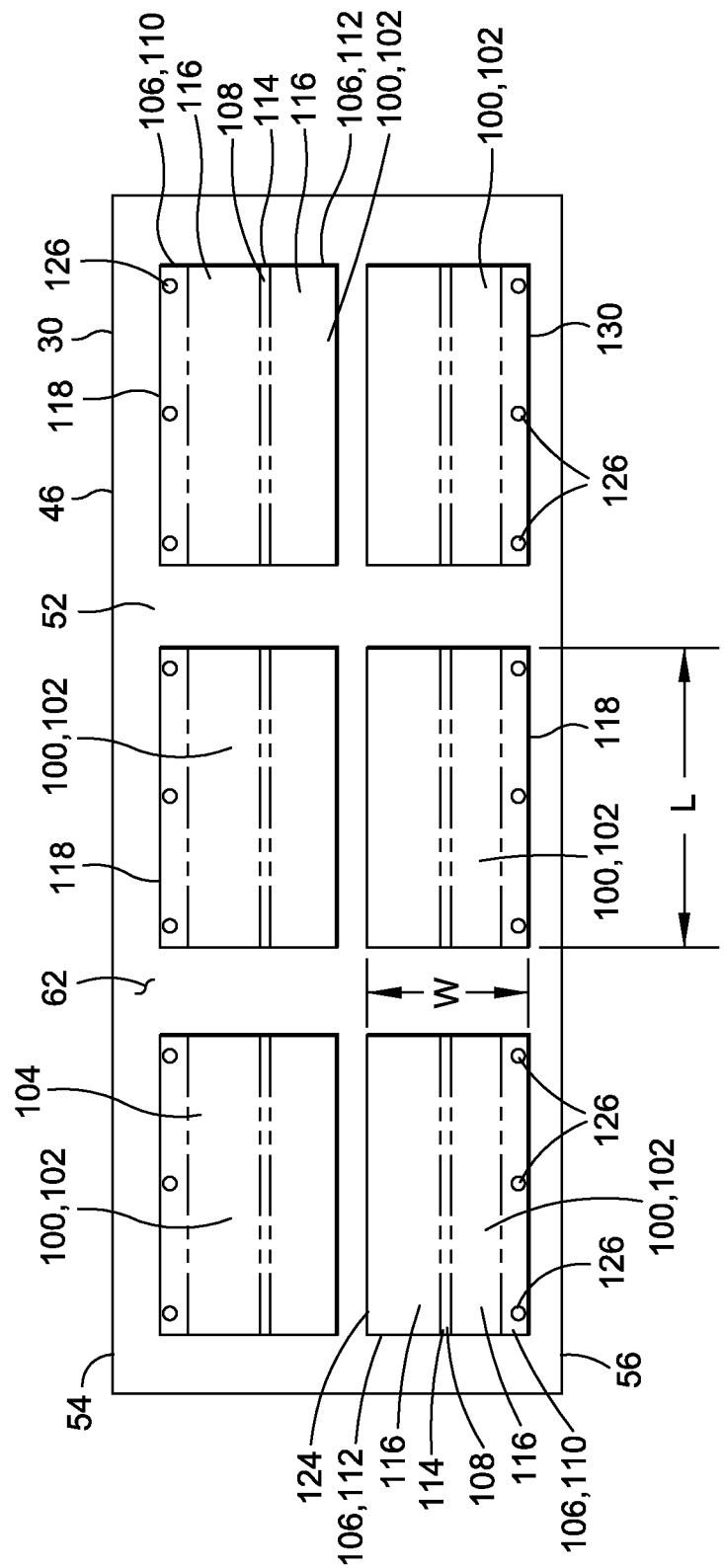

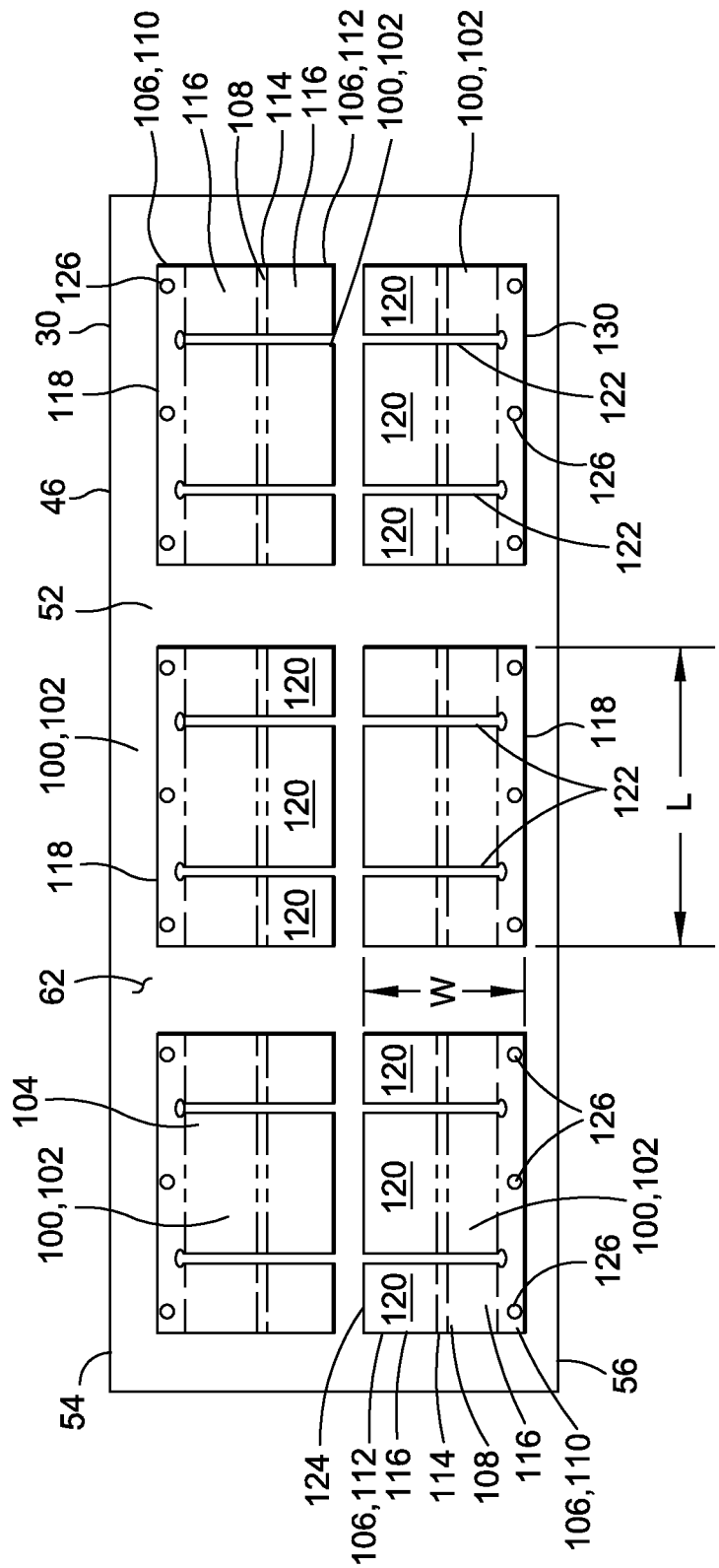

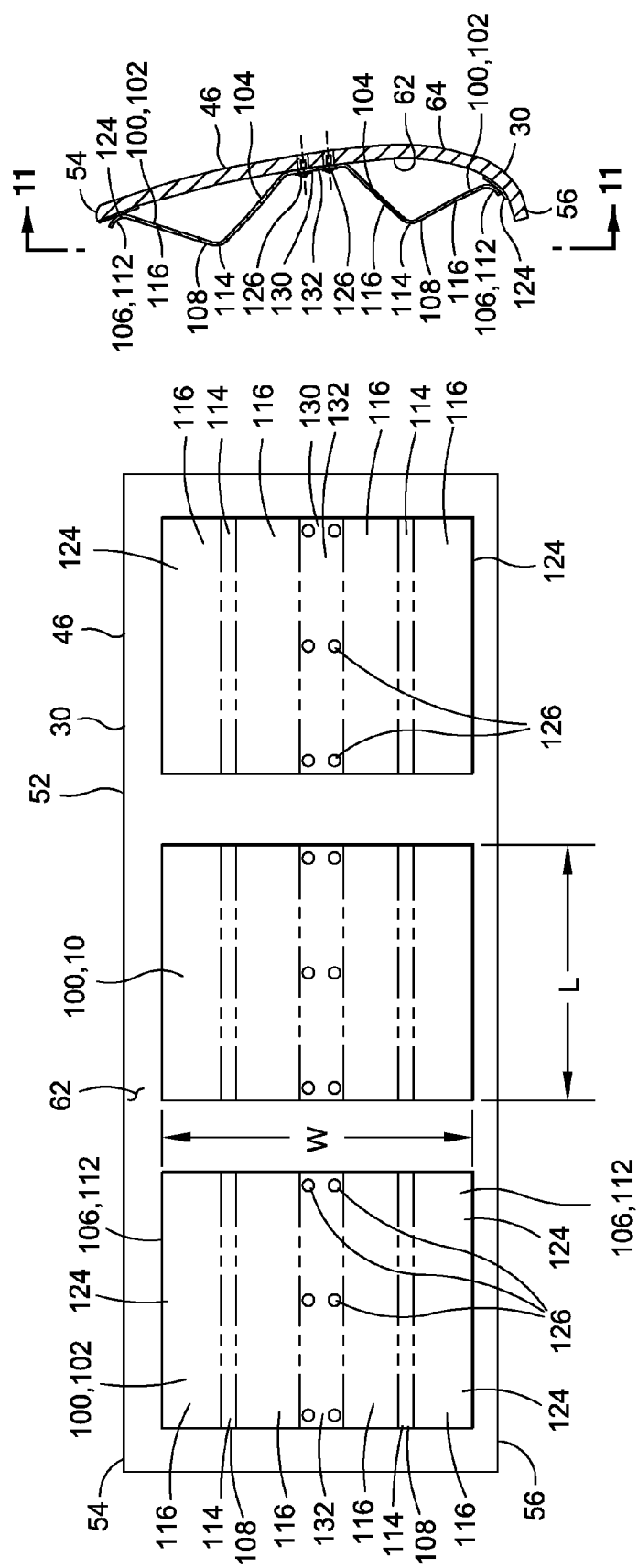

ARTICLE RETENTION DEVICE

FIELD

The present disclosure relates generally to stowage bins and, more particularly, to a device for retaining articles against movement within a stowage bin.

BACKGROUND

Many forms of mass transportation such as trains, buses and commercial aircraft include onboard storage in the passenger compartments. For example, the aircraft cabin of a commercial airliner typically includes a row of stowage bins in the overhead structure above the passenger seating. Such stowage bins were originally intended to store relatively lightweight items such as articles of clothing including hats and coats and hand-carried articles such as briefcases and purses. However, passengers are increasingly storing relatively large and heavy items such as carry-on luggage, backpacks and laptop computers in overhead stowage bins.

Ideally, stowage bins are loaded such that relatively large and heavy items and articles having flat and relatively hard exterior surfaces are placed on the bottom of the stowage bin. Articles that are relatively lightweight or which have a soft exterior are preferably placed on top of the larger, heavier items. By loading the stowage bin with the relatively large and heavy articles on the bottom and the relatively lightweight and soft items on top, the risk of undesirable effects due to dislodgement of the articles when the door of the stowage bin is opened is reduced. Dislodgement of articles may occur as a result of shifting of the articles within the stowage bin during the course of the flight as a result of turbulence or flight maneuvers. Dislodgement of articles may also occur as a result of removal of an article by a passenger during the course of the flight and improper reloading of the article to an unstable position within the stowage bin.

To reduce the risk of dislodgement of articles upon opening of the stowage bin door, commercial aircraft typically include warning placards conspicuously posted on the exterior of the stowage bin indicating that articles within the stowage bin may have shifted during flight. In addition, prior to landing, flight attendants typically make an announcement to alert passengers that articles within the stowage bins may have shifted during flight and requesting that passengers exercise caution when opening the stowage bin doors.

Attempts to reduce the risk of dislodgement of articles from the stowage bin upon opening the stowage bin door include the installation of a secondary door or visor that is pivotably mounted to the stowage bin and which is installed inside of the main or outer stowage bin door. The secondary door or visor is pivotably extended over the bin opening and mechanically secured to the lower edge of the stowage bin after the stowage bin is loaded with articles prior to closing the main stowage bin door. The secondary door or visor is comprised of netting or transparent panels that allow passengers or flight attendants to view articles within the stowage bin upon opening the main stowage bin door to determine whether any of the articles have shifted to an unstable position during the course of the flight. Passengers or flight attendants may then prevent potential dislodgement of such articles when opening the secondary door or visor by grasping the articles.

Unfortunately, the secondary door or visor as described above suffers from several defects which detract from its overall utility. For example, the secondary door or visor is only effective if properly secured over the bin opening prior to closing the main stowage bin door once the articles are loaded such as prior to takeoff of the aircraft. Furthermore, the effectiveness of the secondary door or visor in preventing dislodgement of articles is dependent on the discretion and responsibility of passengers to re-secure the secondary door or visor each time the stowage bin is accessed during the course of a flight. A further drawback associated with the secondary door or visor is the weight and complexity that a set of secondary doors adds to the overhead structure.

As can be seen, there exists a need in the art for a device for retaining articles within a stowage bin that prevents dislodgement of such articles. Furthermore, there exists a need in the art for a device for retaining articles within a stowage bin without reducing the usable volume of the bin interior for stowing luggage. Additionally, there exists a need in the art for a device for retaining articles within a stowage bin which is simple in construction, low in cost and lightweight.

BRIEF SUMMARY

The above-described needs associated with retention of articles within stowage bins are specifically addressed and alleviated by the article retention device disclosed herein. In an embodiment, the article retention device may be mounted on a stowage bin having a bin interior. The stowage bin may further include a door panel which may be movable between open and closed positions and which may have a door inner side. The article retention device may comprise a spring member which may have a protruding portion protruding from the door inner side toward the bin interior when the door panel is in the closed position. The protruding portion may deflect in response to contact with an article contained within the bin interior such that the spring member applies pressure to the article to prevent relative movement of the article. Advantageously, the protruding portion is compressible such that pressure is applied to the articles contained within the stowage bin in a manner that the interior volume of the stowage bin is substantially maintained.

In a further embodiment, disclosed is a bin assembly which may comprise a stowage bin and an article retention device. The stowage bin may have a bin interior and a door panel which may be movable between open and closed positions and which may include a door inner side. The article retention device may include a spring member mounted to the door panel and which may have a protruding portion protruding from the door inner side into the bin interior when the door panel is in the closed position. The protruding portion may deflect in response to contact with an article contained within the bin interior. In this manner, the spring member applies pressure to the article to prevent movement of the article relative to other articles or relative to stowage bin.

Further disclosed is an aircraft which may include an overhead structure. The overhead structure may comprise a stowage bin which may be included with the overhead structure and which may have a bin interior. The stowage bin may further include a door panel which may be movable between open and closed positions and which may include a door inner side. The aircraft may include the article retention device which may comprise a compressible spring member mounted to the door panel and having a fixed end and a translatable end. The compressible spring member may include a protruding portion which may extend between the fixed end and the translatable end.

In an embodiment, the compressible spring member may comprise a leaf spring arrangement. The fixed end may be fixedly mounted to the door inner side. The translatable end may be laterally slidable along the door inner side during deflection of the protruding portion. The protruding portion may protrude into the bin interior when the door panel is in the closed position. The protruding portion may be deflectable in response to contact with an article contained within the bin interior such that pressure is applied to the article to prevent relative movement thereof.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 5 is an enlarged sectional side view of a base portion comprising the fixed end of the article retention device and illustrating the fixed end being fixedly mounted to the door inner side by means of a mechanical fastener;

FIG. 6 is an enlarged sectional side view of a translatable end of the article retention device and further illustrating a slide strip fixedly secured to the door inner side of the door panel;

FIG. 7 is a plan view of the door inner side taken along line 6 of FIG. 3 and illustrating a plurality of the article retention devices mounted along the door inner side in spaced relation to one another;

FIG. 8 is a plan view of the door inner side illustrating an embodiment of the article retention devices including a plurality of fingers separated by slots;

FIG. 10 is a side view of the door panel illustrating the article retention device in an embodiment having a pair of protruding portions separated by a center portion fixedly mounted to the door inner side; and FIG. 11 is a plan view of the door inner side illustrating the embodiment of the article retention device illustrated in FIG. 9 mounted in spaced relation along the door inner side.

DETAILED DESCRIPTION

Figure 1:
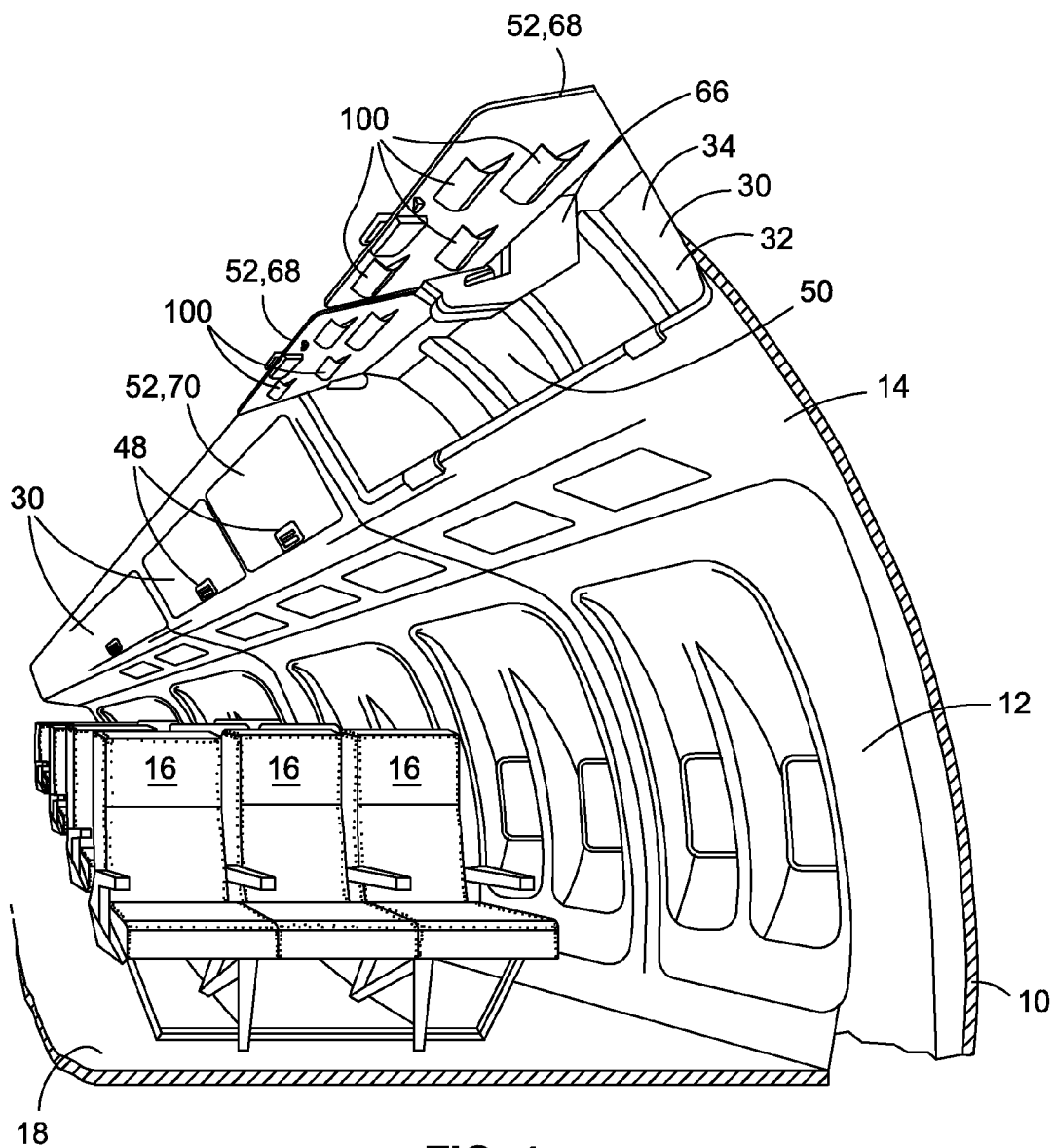
FIG. 1 is a perspective illustration of a portion of an aircraft cabin having an overhead structure comprising a plurality of stowage bins.

Referring now to the drawings wherein the showings are for purposes of illustrating preferred and various embodiments of the disclosure, shown in FIG. 1 is a perspective illustration of an aircraft cabin 12 of a commercial aircraft 10. The aircraft cabin 12 includes an overhead structure 14 extending along one of the side walls and/or ceiling of the aircraft cabin 12. The overhead structure 14 includes a row of stowage bins 30 positioned above the passenger seats 16. The stowage bins 30 may be accessible from the aisles 18 extending along the aircraft cabin 12. Each one of the stowage bins 30 may include a bin interior 32 and may include one or more door panels 52 for enclosing the bin interior 32 of the stowage bin 30. The bin interior 32 may be loaded with articles 20 (FIGS. 2-3) of any size, shape and type including, but not limited to, luggage 22, packages, laptop computers and any other type of article, without limitation.

As shown in FIG. 1, at least one of the stowage bins 30 may include one or more article retention devices 100 that may be mounted to the door panel 52. The article retention device 100 may protrude or extend into the bin interior 32 of the stowage bin 30 when the door panel 52 of the stowage bin 30 is moved from an open position 68 to a closed position 70. Advantageously, the article retention devices 100 may reduce or prevent movement or shifting of articles 20 within the bin interior 32.

In this regard, the article retention device 100 may deflect or compress when in contact with one or more of the articles 20 stored within the bin interior 32 such that the article retention device 100 applies pressure to the articles 20 to prevent relative movement of the articles 20. The article retention device 100 may be configured to compress in such a manner that the total amount of available interior volume 34 (FIGS. 2-3) of the stowage bin 30 is substantially similar to the amount of available interior volume 34 for stowage bins 30 that lack article retention devices 100. In an embodiment, the interior volume 34 of each stowage bin 30 is essentially maintained due to the capability of the article retention device 100 to substantially compress against the door inner side 62 (FIG. 2) in response to contact of the article retention device 100 with one or more articles 20 contained within the stowage bin 30.

Figure 2:
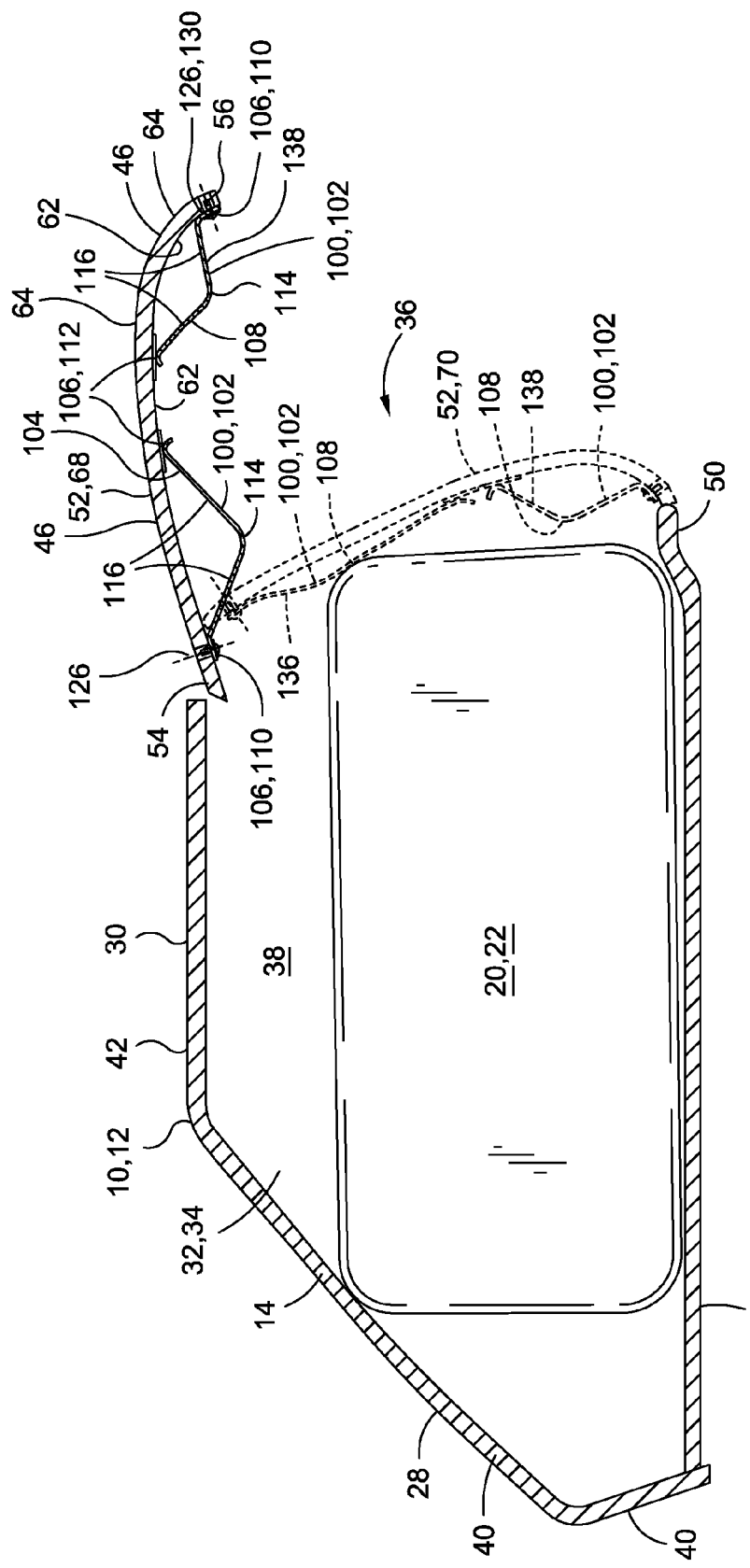
FIG. 2 is a cross-sectional side view of a stowage bin having an upwardly pivoting door panel and further illustrating article retention devices mounted to the door panel on a door inner side of the door panel.

In an embodiment as shown in FIG. 2, the article retention device 100 may comprise a spring member 102 (FIGS. 2-3) that may be configured in a leaf spring arrangement 104 (FIGS. 2-6) wherein a protruding portion 108 (FIGS. 2-3) of the spring member 102 may protrude from the door inner side 62 toward the bin interior 32 when the door panel 52 is in the closed position 70. In an embodiment, the article retention device 100 may be configured such that the protruding portion 108 may be compressed or deflected substantially toward or against the door inner side 62 such that a substantial entirety of the interior volume 34 of the stowage bin 30 is maintained.

Although FIG. 1 illustrates the article retention devices 100 mounted on the door panel 52 of a stowage bin 30 of an aircraft cabin 12, it is contemplated that the article retention device 100 may be mounted to a stowage bin 30 of a variety of vehicular or non-vehicular applications. For example, the article retention devices 100 may be implemented in vehicular applications including watercraft, land vehicles, aircraft and spacecraft. Furthermore, the article retention devices 100 may be implemented on non-vehicular applications where restraint or retention of articles 20 against movement is desired.

Referring to FIG. 1, the article retention device 100 is shown installed on or incorporated into the door inner side 62 (FIG. 2) of a pair of the door panels 52 of one of the stowage bins 30 of the overhead structure 14. Each stowage bin 30 may include one or more door assemblies 46 (FIG. 2) which may comprise one or more hinge mechanisms 66 (FIGS. 5-6) for pivotably opening the door panel 52 in an upward and outward direction from a closed position 70 to an open position 68 in order to expose the bin interior 32 to allow for loading and unloading of articles 20. Each one of the door panels 52 may have a door inner side 62 and a door outer side 64 (FIGS. 2-3) and may include one or more latch mechanisms 48 for latching or locking the door panel 52 in the closed position 70.

Figure 3:
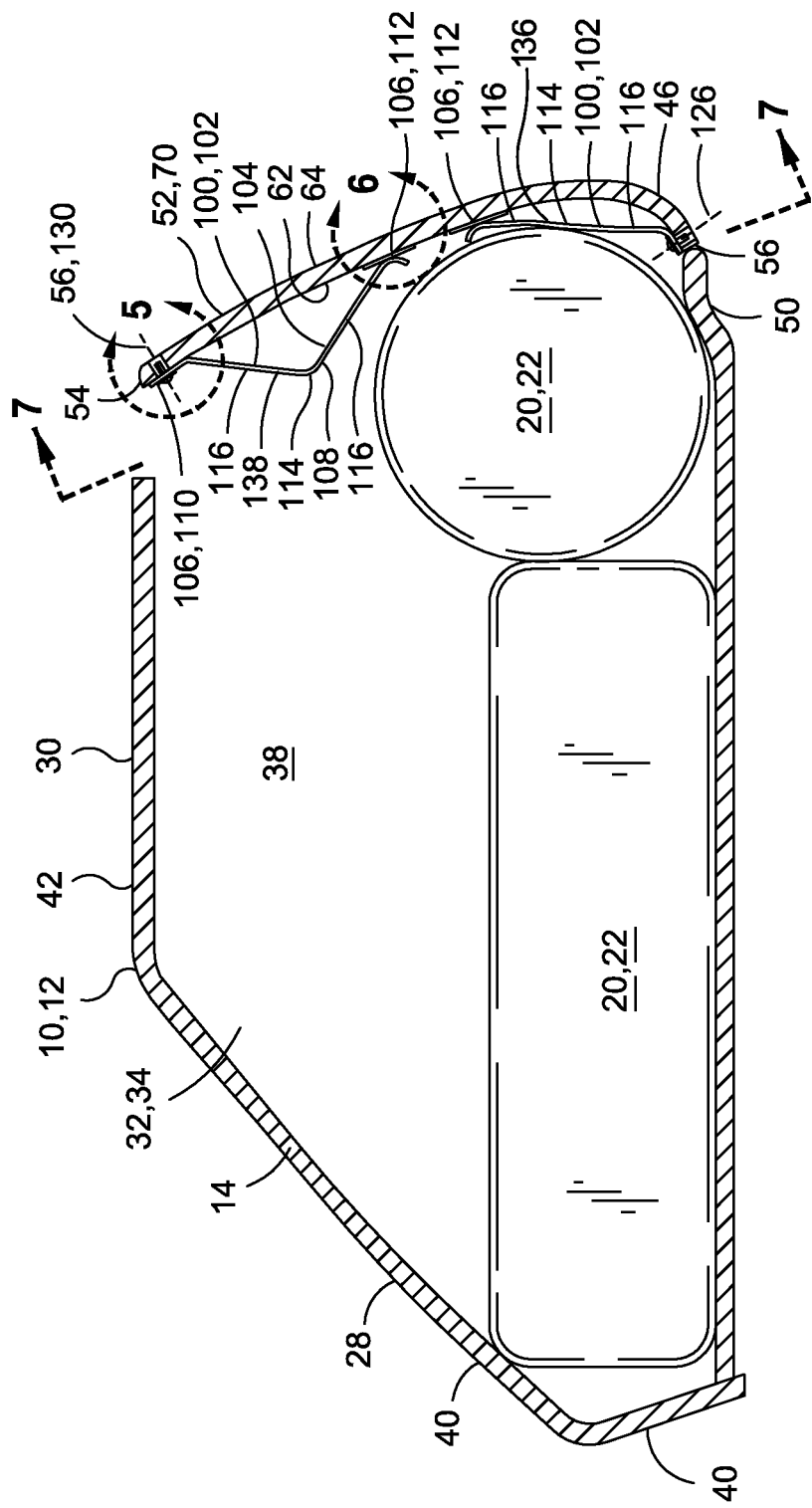
FIG. 3 is a cross-sectional side view of the stowage bin illustrating the door panel in the closed position and further illustrating one of the article retention devices in a deflected position in response to contact of the article retention device with an article contained within the stowage bin.

Referring to FIGS. 2-3, shown is a cross-sectional side view of a stowage bin 30. The stowage bin 30 comprises a bin assembly 28 including the door panel 52 which is illustrated in FIG. 2 in the open and closed positions 68, 70. The stowage bin 30 may be provided in any one of a variety of configurations for enclosing a bin interior 32 and defining an interior volume 34. For example, as illustrated in FIG. 2, the stowage bin 30 may include one or more rear walls 40, a bottom wall 44 having a ledge 50, a top wall 42 and a pair of opposing end walls 38 for collectively enclosing the bin interior 32 of the stowage bin 30. Any one of the rear walls 40, top wall 42, bottom wall 44 and end walls 38 of the stowage bin 30 may be at least partially formed by the side walls and/or ceiling of the aircraft cabin 12 (FIG. 1). However, the stowage bin 30 configuration illustrated in FIGS. 2-3 is exemplary only and is not to be construed as limiting alternative configurations of stowage bins 30. Even further, the stowage bin 30 is not limited to arrangements where the bin interior 32 is enclosed on all sides but may encompass arrangements wherein the stowage bin 30 is at least partially open on one or more sides of the stowage bin 30.

Referring to FIG. 2, shown is the door panel 52 which is illustrated as being pivotable outwardly and upwardly away from the bin opening 36 of the stowage bin 30 in order to expose the bin interior 32. In this regard, the door panel 52 illustrated in FIGS. 2 and 3 is pivotable along a door upper edge 54 of the door panel 52. The door lower edge 56 of the door panel 52 may be latched or otherwise secured to the stowage bin 30 in the closed position 70 by means of one or more latch mechanisms 48 similar to that which is illustrated in FIG. 1.

Although the door panel 52 is illustrated in FIGS. 2-3 as being pivotably attached to the stowage bin 30 along the door upper edge 54, the door panel 52 may be configured in a variety of alternative door opening arrangements. For example, the door panel 52 may be pivotable along the door lower edge 56 or along a side of the door panel 52. Furthermore, the present disclosure is not limited to door panels 52 that are pivotable along the door upper and lower edges 54, 56 but may also include door panels 52 that are movable between open and closed positions 68, 70 by a combination of pivoting, translation or other door-opening and closing arrangements. For example, the door panel 52 may be moved from a closed position 70 to an open position 68 by translating the door panel 52 in a lateral direction away from the stowage bin 30.

Referring to FIG. 2, shown are a pair of article retention devices 100 mounted to the door panel 52 along the door inner side 62. The article retention device 100 may comprise spring members 102 that may be mounted in spaced relation to one another on the door inner side 62. Although FIG. 2 illustrates a pair of article retention devices 100 mounted to the door panel 52, the door panel 52 may include any number of article retention devices 100. For example, FIGS. 6-10 illustrate a plurality of article retention devices 100 mounted on the door inner side 62 in a variety of arrangements and configurations as described in greater detail below.

FIG. 2 illustrates the upper spring member 102 being compressed such that the protruding portion 108 is moved into a deflected position 136 causing the translatable end 112 of the spring member 102 to move or slide laterally relative to the door inner side 62. FIG. 3 illustrates a lower one of the spring members 102 being compressed wherein the protruding portion 108 is moved into the deflected position 136 (FIG. 2) toward the door inner side 62 such that pressure is applied to the article 20 to resist or prevent relative movement of articles 20 contained within the stowage bin 30.

Figure 4:
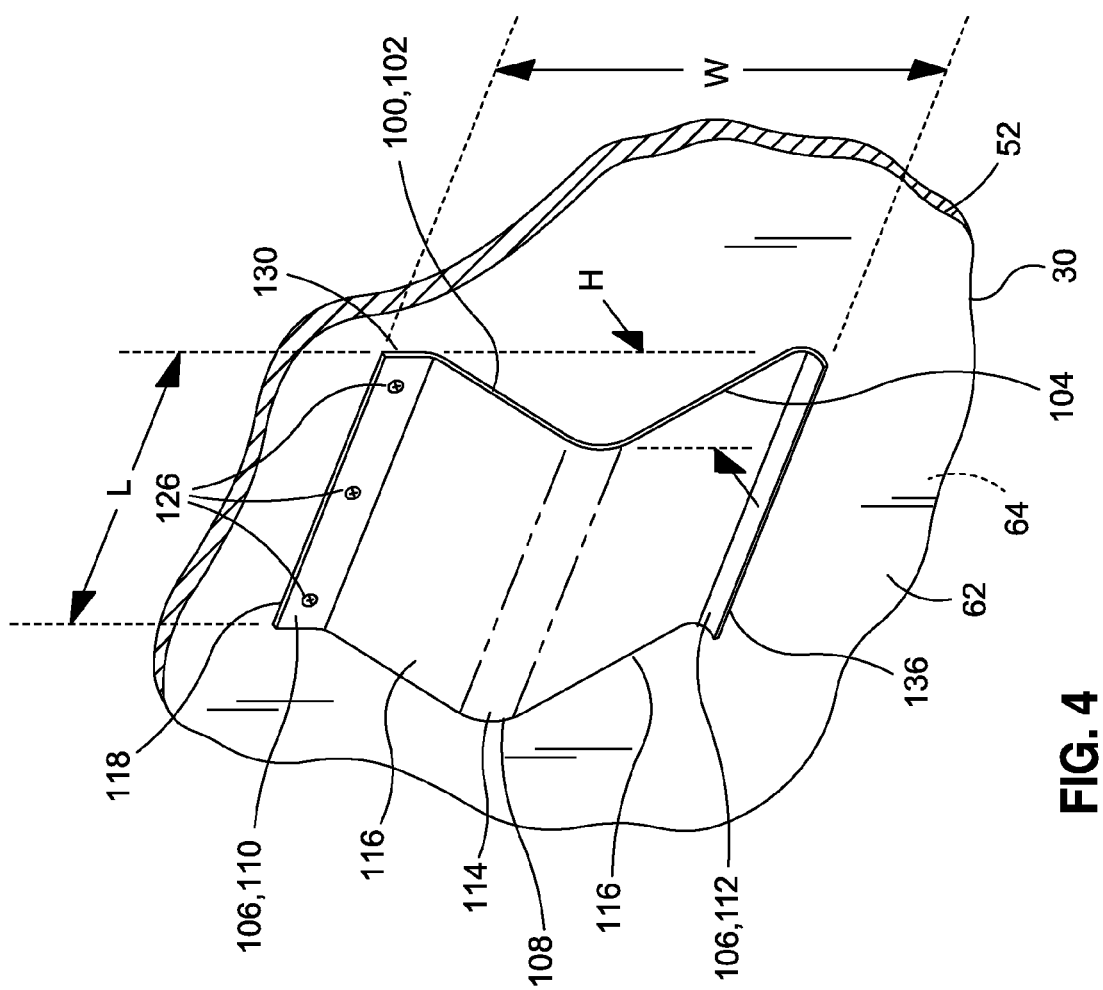
FIG. 4 is a perspective illustration of an embodiment of the article retention device mounted to the door inner side of the door panel.

Referring to FIG. 4, shown is a perspective illustration of an embodiment of the article retention device 100 mounted to the door panel 52. The article retention device 100 may comprise the spring member 102 which may be formed in the above-mentioned leaf spring arrangement 104. The spring member 102 may include an opposing pair of base portions 106 and may have a protruding portion 108 extending between the base portions 106. As can be seen in FIG. 4, the protruding portion 108 protrudes outwardly from the door inner side 62. The protruding portion 108 may define an apex 114 which may comprise the portion of the protruding member that extends the furthest distance outwardly from the door inner side 62. Each one of the base portions 106 defines a terminus of the spring member 102. One of the base portions 106 may comprise a fixed end 110 which may be fixedly mounted to the door inner side 62 such as by means of one or more mechanical fasteners 126 and/or by means of adhesive 130. The other one of the base portions 106 may comprise a translatable end 112 that may be laterally translatable relative to the door inner side 62.

As can be seen in FIG. 4, the protruding portion 108 may comprise a pair of straight sections 116 extending from respective ones of the fixed end 110 and the translatable end 112 and converging at the apex 114 of the protruding portion 108. In this regard, the spring member 102 may define a generally triangular shape with the door inner side 62. However, it should be noted that the protruding portion 108 may be formed in any size, shape and configuration and is not limited to that which is illustrated in the Figures. For example, as an alternative to the straight sections 116, it is contemplated that the protruding portion 108 may have an arc shape or a rounded shape between the fixed end 110 and translatable end 112.

In an embodiment, the protruding portion 108 may form an arc of generally constant radius from the fixed end 110 to the translatable end 112 of the spring member 102. However, the protruding portion 108 may have a variable radius wherein the radius may increase from the fixed end 110 toward an apex 114 and may decrease from the apex 114 to the translatable end 112. As may be appreciated, the spring member 102 may be provided in a variety of alternative sizes, shapes and configurations.

Referring to FIGS. 5-6, shown are cross-sectional side views of the fixed end 110 (FIG. 5) and the translatable end 112 (FIG. 6) of the spring member 102. As can be seen in FIG. 5, the spring member 102 may be mounted to the door panel 52 by means of mechanical fasteners 126 (FIG. 4) passing through the fixed end 110 and extending into the door panel 52. In an embodiment, the door panel 52 may comprise a sandwich construction including a pair of face sheets 58 laminated to opposite sides of a core 60. The mechanical fasteners 126 securing the fixed end 110 to the door panel 52 may threadably engage an insert 128 which may be potted within (e.g., bonded to) the core 60 material. In addition, the mechanical fasteners 126 extending through the fixed end 110 of the spring member 102 may be threadably engaged to nut plates or other suitable threaded receptacles that may be mounted to the door panel 52.

Alternatively or in addition to mechanical fastening of the spring member 102 to the door panel, the fixed end 110 may be bonded to the door inner side 62 (FIG. 2) such as by using a suitable adhesive 130. Even further, the fixed end 110 may be integrally formed with the door panel 52. In this regard, the spring member 102 may be formed of polymeric materials that may be of the same or similar material system from which the door panel 52 is formed. For example, the spring member 102 may be formed of composite materials that may be layed up, co-bonded and/or co-cured with the door panel 52. However, the spring member 102 may be formed as a separate component that may be fastened to the door panel 52 as illustrated in the Figures.

Referring to FIG. 6, shown is an enlarged cross-sectional side view of the translatable end 112 of the spring member 102 which may be in slidable contact with the door panel 52. The translatable end 112 may be laterally movable along a direction indicated by the arrow 134. As can be seen in FIG. 6, the translatable end 112 may be upturned or upwardly curved away from the door inner side 62 to avoid or prevent catching of the translatable end 112 on the door inner side 62 during relative movement therebetween. Further in this regard, the article retention device 100 may optionally include a slide strip 124 which may be mounted to the door inner side 62 or integrally formed with the door inner side 62.

As can be seen in FIG. 6, the slide strip 124 may be positioned between the translatable end 112 of the article retention device 100 and the door inner side 62. The slide strip 124 may prevent or reduce wear of the translatable end 112 during repeated sliding motion of the translatable end 112. The slide strip 124 may also prevent or reduce wear of the door inner side 62 during sliding motion of the translatable end 112. The slide strip 124 may be formed of any suitable material and may comprise a layer of material which may be similar to or identical to the material from which the door panel 52 and/or face sheet 58 are formed. In this regard, the slide strip 124 may comprise any polymeric and/or metallic material or any combination thereof to prevent wear of the door panel 52.

Referring to FIG. 7, shown is a plan view of a plurality of article retention devices 100 mounted on the door inner side 62. The article retention devices 100 or spring members 102 each define a length L and a width W. The ratio of the length L divided by the width W defines a base aspect ratio of the spring member 102. Each one of the spring members 102 may have a base aspect ratio of approximately 0.5 to approximately 5.0 although the spring members 102 may be formed in any base aspect ratio. For example, the spring members 102 illustrated in FIG. 7 may have a base aspect ration of between approximately 1.0 to approximately 2.0.

Referring still to FIG. 7, the article retention devices 100 may be positioned in spaced relation to one another. The article retention devices 100 may be substantially uniformly distributed throughout the area of the door inner side 62. However, the article retention devices 100 may be positioned in any pattern or arrangement without limitation. For example, it is contemplated that the article retention devices 100 may be positioned toward the door upper edge 54 of the door panel 52 which may be more susceptible to contact with articles 20 (FIGS. 2-3) that may be stacked on top of other articles 20 in the stowage bin 30 and therefore may be more susceptible to shifting or movement. Even further, it is contemplated that the article retention devices 100 may be mounted in one or more rows along the door upper edge 54 of the door panel 52 and the lower portion of the door panel 52 may be substantially devoid of article retention devices 100. In this regard, the article retention devices 100 may be mounted in any suitable pattern or arrangement along the door inner side 62.

The article retention device 100 may be formed such that the protruding portion 108 (FIG. 2) extends into the bin interior 32 at a distance defined by the height H (FIG. 4) of the protruding portion 108. The height H may be defined as the distance from the apex 114 (FIG. 4) of the protruding portion 108 to the door inner side 62. The height H of the protruding portion 108 may be sized in consideration of the width W of the spring member 102. In the embodiment illustrated in FIG. 4, the spring member 102 may have a height aspect ratio represented by the height H of the spring member 102 divided by the width W of the spring member 102. In an embodiment, the spring member 102 may have a height aspect ratio of from approximately 0.1 to 1.0 and, more preferably, the spring member 102 may have a height aspect ratio of approximately 0.3 to 0.7 although the spring member 102 may be formed with any suitable height aspect ratio. The height aspect ratio may be selected based upon the stiffness of the spring member 102 which may dictate the desired amount of force or pressure applied to an article 20 in contact with the spring member 102.

In this regard, the mechanical properties of the material from which the spring member 102 is fabricated may dictate, at least in part, the desired height aspect ratio of the spring member 102. The spring member 102 is preferably fabricated of material that is resistant to plastic deformation under relatively large loads. For example, the spring member 102 may be fabricated of a sheet of polymeric material, spring steel, stainless steel or any other suitable metallic or non-metallic material or combination thereof. The material type or material thickness for the spring member 102 may be selected base upon the yield strength of the material such that the spring member 102 may resist permanent deformation when subjected to relatively high compressive loads that may occur when the apex 114 is deflected or compressed into close proximity to the door inner side 62. In a non-limiting embodiment, the spring member 102 may be fabricated of metallic and/or non-metallic material having a thickness of between approximately 0.020 and 0.150 inch.

Referring to FIG. 7, shown are a plurality of the article retention devices 100 or spring members 102 mounted to the door panel 52 in spaced relation to one another. As can be seen, a row of the article retention devices 100 may be mounted along the door upper edge 54 and a row of the article retention devices 100 may be mounted along the door lower edge 56. The article retention devices 100 may be secured to the door panel 52 by means of mechanical fasteners 126 and/or by adhesive 130 bonding of the edge 118 of the fixed end 110 of each of the article retention devices 100 to the door inner side 62 as described above. Likewise, the row of article retention devices 100 mounted along the door lower edge 56 may be attached to the door panel 52 by means of mechanical fasteners 126 and/or adhesive 130 securing the fixed ends 110 of each one of the article retention devices 100 to the door inner side 62.

FIG. 7 illustrates the article retention devices 100 oriented such that the fixed end 110 of each article retention device 100 is positioned proximate the door upper edge 54. However, the article retention devices 100 along the door upper edge 54 may be mounted such that the translatable end 112 of each one of the article retention devices 100 is located proximate the door upper edge 54. Likewise, although FIG. 7 illustrates the article retention devices 100 mounted along the door lower edge 56 are oriented such that the fixed end 110 of each one of the article retention devices 100 is located proximate the door lower edge 56, the article retention devices 100 may be oriented 180° from the orientation illustrated in FIG. 7 such that the translatable ends 112 are located proximate the door lower edge 56.

Referring still to FIG. 7, it should also be noted that although the article retention devices 100 are illustrated as being mounted in vertically stacked arrangement relative to one another wherein the fixed ends 110 are generally aligned with the door upper and lower edges 54, 56, the article retention devices 100 may each be oriented 90° relative to that which is shown in FIG. 7 such that the fixed ends 110 are generally oriented perpendicularly relative to the door upper and lower edges 54, 56. In this regard, the article retention devices 100 may be mounted in any suitable orientation relative to the door upper and lower edges 54, 56 and are not limited to being oriented orthogonally relative to the door upper and lower edges 54, 56.

Referring to FIG. 8, shown is an alternative embodiment of the article retention devices 100 wherein each one of the article retention devices 100 includes one or more slots 122 separating a plurality of fingers 120. Each one of the fingers 120 may be individually compressible independent of the compression of the adjacent protruding portions 108 (i.e., fingers 120). Although the slots 122 separating the fingers 120 are illustrated as being relatively narrow, the slots 122 may be of any width and are not limited to that which is illustrated in FIG. 8. For example, each slot 122 width may be generally equivalent to or greater than the width of the fingers 120. The door panel 52 may be substantially covered by a single one of the article retention devices 100 comprising a plurality of protruding portions 108 or fingers 120 separated by slots 122 in order to minimize part count for reducing the amount of time for installing the article retention devices 100 on the door panels 52.

Figure 9:
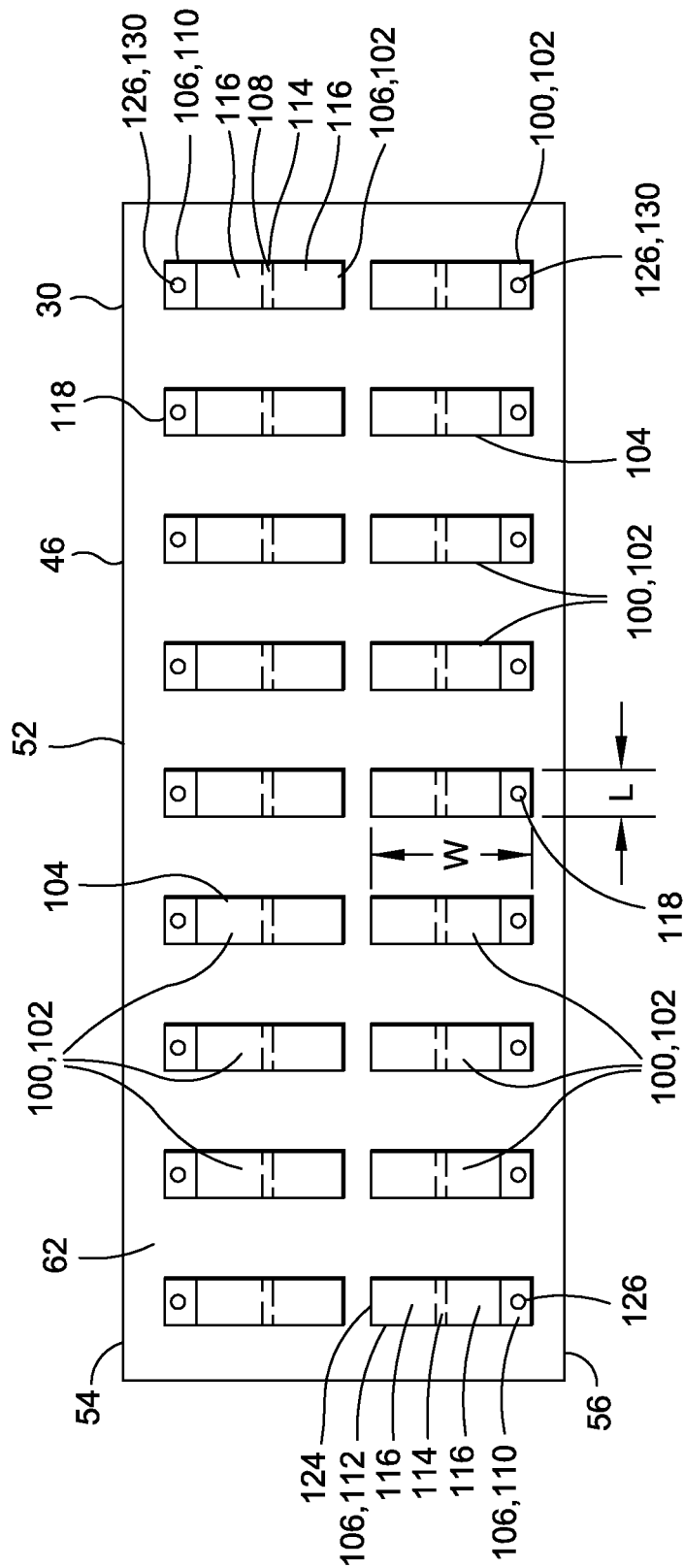
FIG. 9 is a plan view of the door inner side illustrating an embodiment of the article retention devices having a relatively small base aspect ratio.

Referring to FIG. 9, shown is a further embodiment of the article retention devices 100 where each one of the article retention devices 100 or spring members 102 may be formed with a relatively small base aspect ratio. As indicated above, the base aspect ration may be defined as the ratio of the length L of the spring member 102 divided by the width W of the spring member 102. For example, each one of the spring members 102 may be formed with a base aspect ratio of approximately 0.1 to 0.5 although the spring members 102 may be formed in any base aspect ratio. The door panel 52 may include article retention devices 100 (e.g., spring members 102) having different base aspect ratios and is not limited to including article retention devices 100 having substantially equivalent base aspect ratios.

Furthermore, although FIG. 9 illustrates the article retention devices 100 as being mechanically fastened to the door panel 52 along the edge 118 of the article retention devices 100, the article retention devices 100 may be bonded or otherwise fastened to the door panel 52 using any suitable mechanical or chemical attachment means. Even further, as was indicated earlier, the article retention devices 100 may be integrally formed with the door panel 52 such as by laying up and/or co-curing or co-bonding of composite plies (not shown) of the article retention devices 100 simultaneous with the laying up and/or co-curing of the door panel 52.

Referring to FIGS. 10 and 11, shown is a further embodiment of the article retention device 100 (FIG. 10) having a pair of protruding portions 108 separated by a center portion 132. The center portion 132 may be fixedly secured to the door panel 52. As can be seen, the center portion 132 may optionally be fastened to the door inner side 62 by means of one or more mechanical fasteners 126 and/or by using adhesive 130 bonding the center portion 132 to the door inner side 62. In the embodiment shown, the protruding portions 108 may each comprise a pair of straight sections 116 converging toward the apex 114.

As can be seen in FIG. 10, each one of the protruding portions 108 may terminate at a translatable end 112. Each translatable end 112 may be laterally translatable relative to the door inner side 62. For example, each one of the protruding portions 108 may be slidable relative to the door inner side 62 during compression of the respective protruding portions 108. Each one of the protruding portions 108 may be formed at a height aspect ratio defined as the height H of the spring member 102 above the door inner side 62 divided by the width W of the spring member 102. In an embodiment, the spring member 102 may have a height aspect ration of from approximately 0.1 to 1.0 and, more preferably, from approximately 0.3 to 0.7 although the spring member 102 may be formed with any suitable height aspect ratio as indicated above.

Referring to FIG. 11, shown is a plan view of the door panel 52 having a plurality of the article retention devices 100 (e.g., spring members 102) of FIG. 10 mounted to the door inner side 62. As can be seen, each one of the spring members 102 includes the center portion 132 which may be secured or fixedly mounted to the door panel 52 by means of one or more mechanical fasteners 126 and/or adhesive 130. The spring members 102 may be oriented relative to the door panel 52 such that the protruding portions 108 of each spring member 102 are positioned one above the other. In such an arrangement as shown in FIGS. 10-11, the protruding portions 108 of each spring member 102 may be vertically arranged (i.e., oriented perpendicularly relative to the door upper edge 54) when the door panel 52 is in the closed position 70 (FIG. 3). In this regard, the spring members 102 may be mounted to the door panel 52 as shown in FIGS. 10-11 such that for each spring member 102, one of the protruding portions 108 of the spring member 102 is located at a further distance from the door upper edge 54 than the other the protruding portion 108 of the same spring member 102. In an alternative arrangement, the spring members 102 may be mounted to the door panel 52 such that the protruding portions 108 of each spring member 102 are oriented in side-by-side arrangement (i.e. horizontally arranged—not shown) relative to one another when the door panel is in the closed position 70 (FIG. 3). In this regard, each spring member 102 may be mounted to the door panel 52 such that the protruding portions 108 of the spring member 102 are located at substantially the same distance from the door upper edge 54 or door lower edge 56. Referring still to FIGS. 10 and 11, the article retention device 100 may be formed with a base aspect ratio of from approximately 0.5 to 1.0 although the article retention device 100 may be provided in any suitable base aspect ratio.

In operation and referring to FIGS. 1-11, one or more stowage bins 30 may be installed in any vehicular or non-vehicular application with one or more article retention devices 100 being mounted in any suitable arrangement to the door panel 52 such as the non-limiting arrangements illustrated in FIGS. 7-11. As was indicated above, each one of the article retention devices 100 may include a fixed end 110 which may be fixedly mounted to the door inner side 62 by any suitable means including, but not limited to, mechanical fasteners 126 and/or adhesive 130 or any other suitable means. The article retention devices 100 may be mounted in any quantity and are not limited to the plurality of article retention devices 100 illustrated in FIGS. 7-11 but may be limited to a single one of the article retention devices 100 or a relatively large quantity of article retention devices 100 as illustrated in FIG. 9.

As can be seen in FIGS. 2 and 3, a stowage bin 30 may be loaded with one or more articles 20 such as luggage 22, packages or any other items without limitation. The articles 20 may be inserted into the bin interior 32 of the stowage bin 30 through the bin opening 36 (FIG. 2) when the door panel 52 is in the open position 68. As shown in FIG. 2, the door panel 52 may include a plurality of article retention devices 100 which may be mounted in space relation relative to one another at a suitable spacing such that the translatable ends 112 may translate laterally relative to the door inner side 62 upon compression or deflection of the protruding portions 108.

For example, FIG. 2 shows the door panel 52 in the closed position 70 illustrating one of the article retention devices 100 in contact with a portion of the article 20 such that the article retention device 100 is compressed to a deflected position 136 with the door panel 52 in the closed position 70. The article retention device 100 applies pressure or force against the article 20 based upon the spring loaded arrangement of the article retention device 100. In this manner, the article retention device 100 applies pressure to the article 20 to prevent relative movement or shifting thereof.

In another example, FIG. 3 illustrates a plurality of articles 20 contained within the bin interior 32 wherein the lower one of the article retention devices 100 is in contacting relation with one of the articles 20 causing the protruding portion 108 to move to the deflected position 136. In the deflected position 136, the spring member 102 applies pressure to the article 20 to prevent relative movement thereof. The translatable end 112 of the article retention device 100 is translated along the door inner side 62 in the direction 134 as best illustrated in FIG. 6. The article retention device 100 may optionally comprise one or more slide strips 124 (FIG. 6) which may be mounted to the door inner side 62 to prevent wear of the door panel 52.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. An article retention device for a stowage bin having a bin interior and including a door panel being movable between open and closed positions and having a door inner side, comprising:
    a spring member having at least one base portion mounted to the door inner side at a fixed end of the spring member, and including a protruding portion extending between the fixed end and at least one translatable end;
    the protruding portion protruding from the door inner side toward the bin interior when the door panel is in the closed position;
    the protruding portion deflecting in response to contact with an article contained within the bin interior such that the spring member applies pressure to the article; and
    the translatable end being laterally slidable along the door inner side during deflection of the protruding portion and being curved away from the door inner side to prevent catching of the translatable end on the door inner side.

2. The retention device of claim 1 wherein:
    the base portion and protruding portion are configured in a leaf spring arrangement.

3. The retention device of claim 1 wherein:
    the spring member includes a pair of the base portions comprising the fixed end and a translatable end;
    the protruding portion extending between the fixed and translatable ends;
    the fixed end being fixedly mounted to the door inner side;
    the translatable end being laterally slidable along the door inner side during deflection of the protruding portion.

4. The retention device of claim 3 wherein:
    the protruding portion comprises a pair of straight sections extending from respective ones of the fixed and translatable ends and converging at an apex of the protruding member.

5. The retention device of claim 1 wherein:
    the spring member includes a pair of the protruding portions separated by a center portion;
    the center portion being fixedly attached to the door panel.

6. The retention device of claim 5 wherein:
    each one of the protruding portions terminates at a translatable end being slidably translatable along the door inner side.

7. The retention device of claim 5 wherein:
    the spring member is oriented such that the protruding portions are positioned one above the other when the door panel is in the closed position.

8. The retention device of claim 5 wherein:
    the spring member is oriented such that the protruding portions are positioned in side-by-side arrangement when the door panel is in the closed position.

9. The retention device of claim 1 wherein:
    the spring member has a length and a width;
    the spring member having a base aspect ratio defined as the length divided by the width;
    the base aspect ratio being greater than 1.

10. The retention device of claim 1 wherein:
    the door panel is pivotably attached to the stowage bin along a door upper edge.

11. The retention device of claim 1 wherein:
    the door panel includes a plurality of the spring members mounted in spaced relation to one another along the door inner side.

12. The retention device of claim 1 wherein:
    the spring member is attached to the door inner side using at least one of the following: a mechanical fastener, adhesive.

13. The retention device of claim 1 wherein:
    the spring member is comprised of at least one of the following materials: polymeric material, spring steel, stainless steel.

14. A bin assembly, comprising:
    a stowage bin having a bin interior and a door panel being movable between open and closed positions and including a door inner side;
    an article retention device including:
        a spring member having at least one base portion mounted to the door inner side at a fixed end of the spring member, and including a protruding portion extending between the fixed end and at least one translatable end, the protruding portion protruding from the door inner side into the bin interior when the door panel is in the closed position;
        the protruding portion deflecting in response to contact with an article contained within the bin interior such that the spring member applies pressure to the article; and
        the translatable end being laterally slidable along the door inner side during deflection of the protruding portion and being curved away from the door inner side to prevent catching of the translatable end on the door inner side.

15. The bin assembly of claim 14 wherein:
    the spring member includes a pair of the base portions comprising a fixed end and a translatable end of the spring member;

the protruding portion extending between the fixed and translatable ends;

the fixed end being fixedly mounted to the door inner side;

the translatable end being laterally slidable along the door inner side during deflection of the protruding portion.

16. The bin assembly of claim 14 wherein:

the stowage bin includes at least one of a rear wall, a bottom wall, and a pair of opposing end walls collectively enclosing the bin interior.

17. The bin assembly of claim 14 wherein:

the bin assembly is mounted to an overhead structure of a vehicle.

18. The bin assembly of claim 17 wherein:

the vehicle is an aircraft.

19. An aircraft having an overhead structure, comprising:

a stowage bin included with the overhead structure and having a bin interior and a door panel being movable between open and closed positions and including a door inner side; and an article retention device including:

a compressible spring member having a fixed end and a translatable end and a protruding portion extending therebetween, the spring member comprising a leaf spring arrangement;

the fixed end being fixedly mounted to the door inner side;

the translatable end being laterally slidable along the door inner side during deflection of the protruding portion and being curved away from the door inner side to prevent catching of the translatable end on the door inner side;

the protruding portion protruding from the door inner side into the bin interior when the door panel is in the closed position;

the protruding portion being deflectable in response to contact with an article contained within the bin interior such that pressure is applied to the article to prevent relative movement thereof.

* * * * *